Aug. 14, 1934.   H. J. HICK   1,969,846
HIGHWAY GUARD
Filed Sept. 2, 1933   2 Sheets-Sheet 1
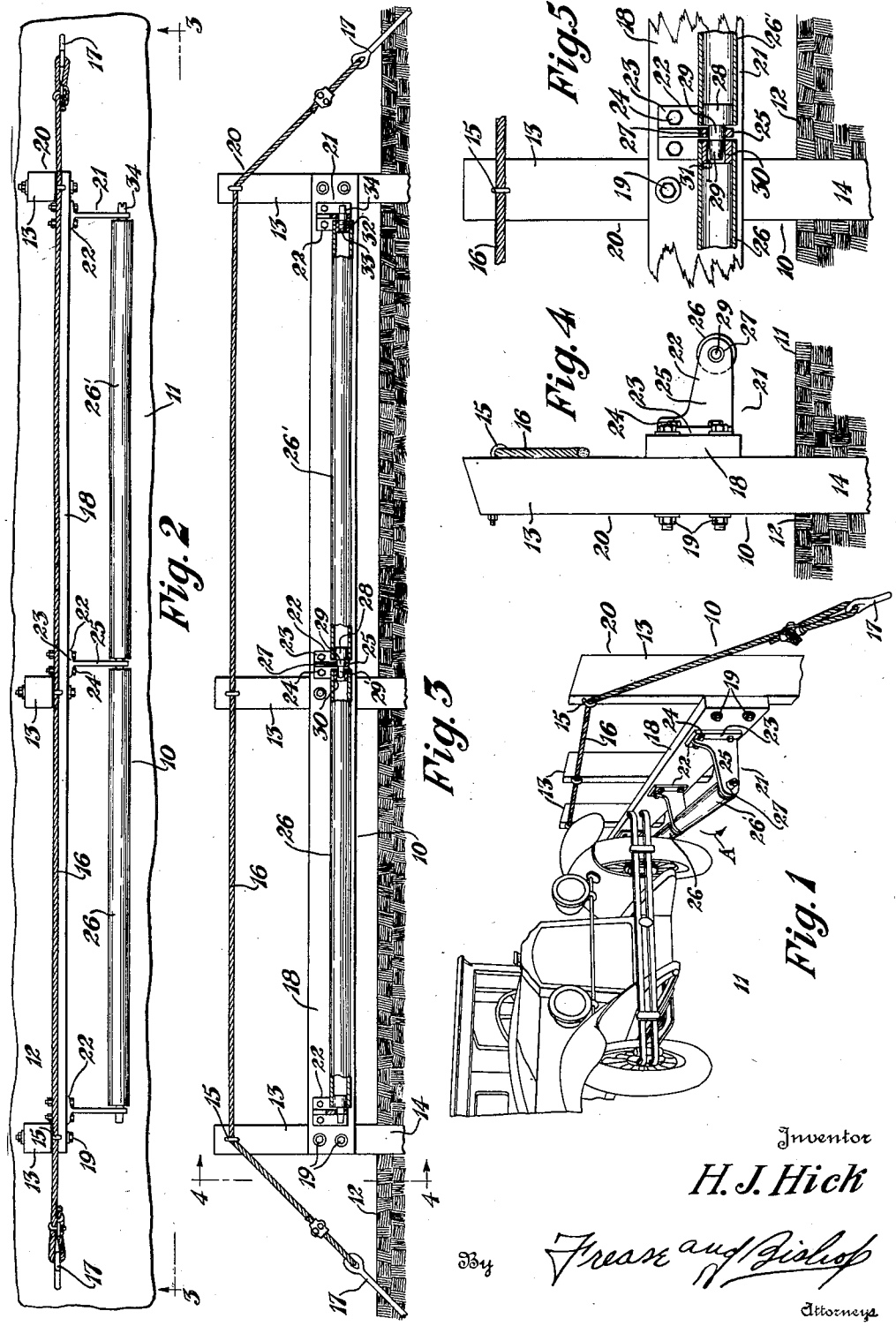
Inventor
H. J. Hick
By Frease and Bishop
Attorneys Aug. 14, 1934.   H. J. HICK   1,969,846
HIGHWAY GUARD
Filed Sept. 2, 1933   2 Sheets-Sheet 2
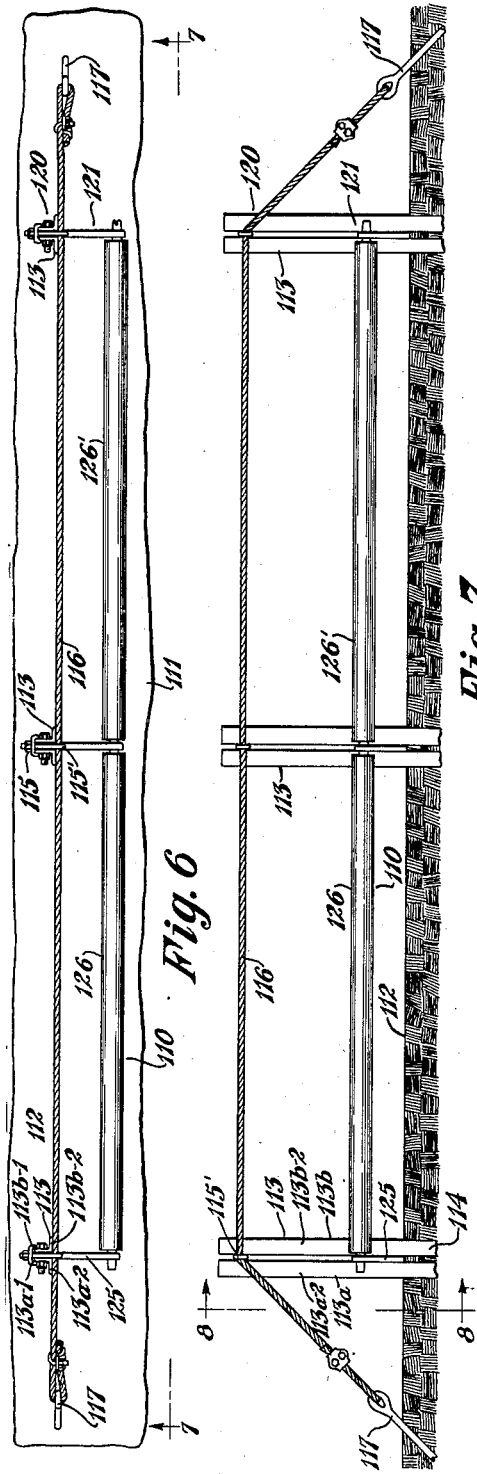
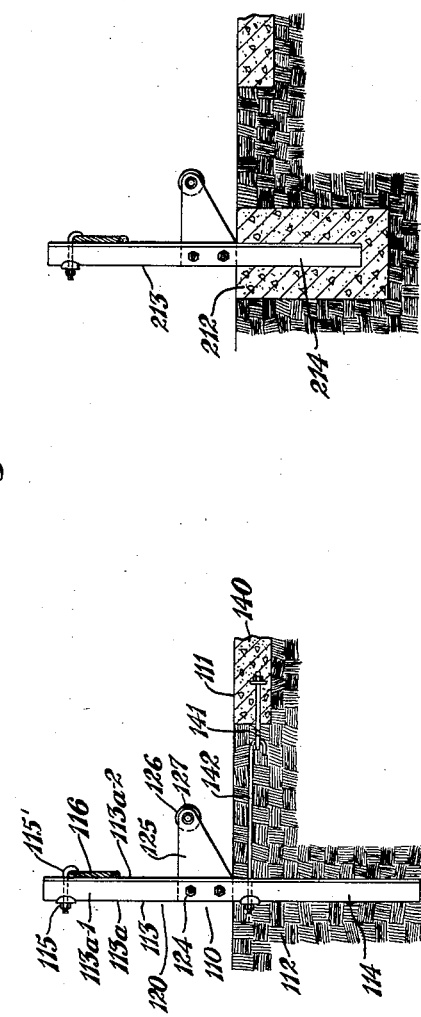
Inventor
H.J.Hick Patented Aug. 14, 1934

1,969,846

UNITED STATES PATENT OFFICE 1,969,846

HIGHWAY GUARD

Harry J. Hick, Alliance, Ohio, assignor to The Machined Steel Casting Company, Alliance, Ohio, a corporation of Ohio Application September 2, 1933, Serial No. 687,974

7 Claims. (Cl. 256—13.1)

My invention relates to deflecting guard apparatus for use along one or more sides of a highway, vehicular bridge, and the like, and adapted for preventing vehicles, particularly passenger automobiles, busses, and motor trucks, from swerving or turning from the normal direction or path of movement in the traffic lane of the highway, bridge, or the like; and the present invention includes improvements in the apparatus set forth in my prior application for United States Letters Patent for Guard rails for highways and the like, filed February 25, 1933, Serial No. 658,483.

Prior to the invention of said application, the usual type of guard rail, safety fence, and the like, provided along the sides of highways, vehicular bridges, and the like, serves merely to obstruct a vehicle which has swerved or been turned to a wrong direction or path of movement off the traffic lane.

An uncontrolled vehicle running into such a usual safety guard rail, safety fence, or the like, is very frequently damaged, and if the speed of the vehicle is sufficient the safety guard rail, safety fence, or the like, may be broken down or through by the vehicle, and the vehicle may continue its uncontrolled course, and may fall into the ditch or ravine, or fall over the cliff, or fall off the bridge, which may be thus unsatisfactorily protected by the particular safety guard rail, safety fence, or the like.

My said prior application sets forth an improved safety guard rail apparatus which includes one or more rotary elongated rail members freely rotatably mounted at one side of and above the traffic lane of a highway, bridge, or the like, each rotary rail member being preferably cylindric and being adapted for deflecting a wheel and usually a front wheel of a vehicle which has swerved or turned towards and run against the rotary rail member from the normal path of movement in the traffic lane protected by the safety guard rail apparatus, and the deflection of a vehicle front wheel by one or more of the rotary rail members serves to direct the vehicle back into the normal path of movement in the traffic lane.

Furthermore, each rotary elongated rail member reacts with the wheel of a vehicle striking the same in such manner as to tend to cause the impinged wheel of the vehicle to remain in its plane of movement with respect to the traffic lane surface and not to rise from the same and jump or bounce over the guard rail apparatus.

The objects of the present improvements include the provision of improvements in the improved safety guard rail apparatus of said prior application, the present improvements being adapted for use in conjunction with a fence, preferably an improved cooperating fence, in such manner that in addition to the deflecting rotary rail members, supplementary fence protection is provided for any vehicle which may strike or careen against the rotary rail members with such speed or in such manner that the vehicle starts to turn over.

Further objects of the present improvements include the provision of deflecting guard apparatus including deflecting means and fence means so associated with each other at one side of a traffic lane that the fence means are rarely if ever struck by a vehicle, the utility of the fence means being in part to reduce the mental hazards of the drivers of vehicles proceeding along a traffic lane protected by the improved apparatus.

Further objects of the present improvements include the provision of an embodiment of the improved rotary guard rail apparatus of my said prior application which is adapted to be combined with a usual highway guard fence structure so as to provide an improved combined deflecting and obstructing guard apparatus.

Further objects of the present improvements include the provision of novel and improved structures and arrangements of certain of the parts of the improved apparatus, whereby the construction of the apparatus as a whole is simplified and is adapted for easy manufacture and erection.

The foregoing and other objects are attained by the improvements, apparatus, parts, combinations, and sub-combinations, which comprise the present invention, and the nature of which is set forth in the following general statement, and preferred embodiments of which, together with their mode of use, are set forth in the following description, and which are particularly and distinctly pointed out and set forth in the appended claims forming part hereof.

The nature of the improved deflecting guard apparatus of the present invention may be stated in general terms as including, in a foundation at one side of a traffic lane of a highway, bridge, or the like, a plurality of longitudinally spaced post members, each post member extending upwardly above the foundation and above the upper surface of the traffic lane of the highway, a plurality of bracket members supported on the post members, the bracket members extending laterally from the post members towards the traffic lane, one or more elongated roller guard rail members rotatably mounted on the bracket members adjacent the traffic lane and laterally spaced from the post members, preferably combined fence and tie means longitudinally extending between and connecting the post members above the bracket members, and preferably means anchoring some of the post members to the foundation.

The improved deflecting and obstructing guard apparatus furthermore preferably includes improvements in the construction, arrangement, and cooperative association of certain parts as are hereinafter set forth, and/or hereinafter set forth and claimed.

Preferred embodiments of the improved apparatus and of the parts thereof are illustrated in the accompanying drawings forming part hereof, in which Figure 1 is a fragmentary perspective view illustrating one embodiment of the improved deflecting guard apparatus in use at one side of a highway, the forward end of an automobile being shown just after the front wheels have been deflected by operation of the improved apparatus;

Fig. 2, a plan view of the improved deflecting guard apparatus of Fig. 1;

Fig. 3, a fragmentary elevation view thereof looking in the direction of the arrows 3—3, Fig. 2 with the foundation thereof shown in section;

Fig. 4, an enlarged end view thereof as at lines 4—4, Figs. 2 and 3, with the foundation thereof broken away and shown in section;

Fig. 5, an enlarged fragmentary view of central portions of Fig. 3 with portions shown in section to illustrate details of construction and arrangement;

Fig. 6, a top plan view of another embodiment of the improved deflecting guard apparatus including an improved construction and arrangement for the posts and brackets thereof;

Fig. 7, a fragmentary elevation view thereof looking in the direction of the arrows 7—7, Fig. 6, with the foundation thereof shown in section;

Fig. 8, an end view thereof as at lines 8—8, Figs. 6 and 7, with the foundation thereof and the adjacent highway broken away and shown in section; and Fig. 9, a view similar to Fig. 8, of another embodiment of the improved apparatus in which the posts thereof are each installed in a concrete foundation.

Similar numerals refer to similar parts throughout the drawings.

One embodiment of the present improved deflecting guard apparatus is illustrated in Figs. 1 to 5 inclusive, and is indicated generally by 10 and is installed at one side of a highway traffic lane 11.

The deflecting guard apparatus 10 includes a foundation 12 which as illustrated is constituted by the earth at the side of the highway traffic lane 11.

A plurality of longitudinally spaced posts 13 have their lower ends 14 embedded and secured in the earth foundation 12, and the posts 13 extend upwardly from the earth foundation 12, and the posts are preferably provided at their upper ends with eye bolts and nut means 15 through the eyes of which a fence or obstructing cable 16 longitudinally extends.

The opposite ends of the cable 16 beyond the end posts of the guard apparatus 10 are preferably angled downwardly and anchored in the earth foundation 12 as by means of deadmen 17.

A longitudinally extending fence plank 18 is secured to the posts 13 as by means of bolt and nut means 19, and the plank 18 is located below the cable 16 and above the upper surface of the traffic lane 11.

The posts 13, the cable 16, and the plank 18 associated with each other as above described, constitute one form of guard fence which is commonly used along the sides of highways.

As aforesaid, one of the objects of the present invention is to provide a structure for the combined deflecting and obstructing guard apparatus, of such nature as to include a usual type of fence construction to be used as the obstructing means and the mounting means for the deflecting means of the combined apparatus.

Accordingly the posts 13, the cable 16, and the plank 18 associated with each other as above described, may be said to constitute obstructing and mounting means which may be designated generally by 20, and rotary deflecting means designated generally by 21 are operatively mounted on the plank 18 of the obstructing and mounting means.

The rotary deflecting means 21 includes a plurality of longitudinally spaced brackets 22, each bracket including a base member 23 which is abutted against and secured to the plank 18 as by nut and bolt means 24, and each bracket further including a roller mounting member 25 extending in use laterally outwardly from its base member 24 towards the highway traffic lane 11.

Longitudinally extending roller guard rail members 26 and 26' are rotatably mounted on the brackets 22, each roller member extending between adjacent pairs of the brackets.

As illustrated, each of the roller members 26 and 26' is preferably cylindric and may be a piece of standard welded steel pipe, each piece of pipe having a length which may be 6 to 8 feet and upwards, and having an outer diameter of preferably 2⅞ to 6⅝ inches or more, and in any event the roller members 26 and 26' have diameters of such magnitude that their outer cylindric surfaces extend beyond the outer ends of the mounting members 25 as best shown in Figs. 1 and 4.

The brackets 22 mounted on the planks 18, are so located, that the longitudinal axes of the deflecting roller guard rail members 26 and 26' are preferably located at an elevation which is less than 15 inches and is substantially 8½ inches above the upper surface of the highway traffic lane 11, so that the guard rail members are below the axles and bumpers of usual motor vehicles.

Each roller mounting member 25 is preferably provided adjacent its outer end with a cylindric bearing aperture 27.

Each of the roller members 26 and 26' preferably has one end shrunk over a metal plug 28 fitting the inner diameter of the pipe roller member, and each plug 28 has a journal stub 29 of reduced diameter, which is adapted to project beyond the end of the roller member and through the bearing aperture 27 of an adjacent roller mounting member 25 for journalling therein.

The other end of each roller 26 is preferably shrunk over an annular bearing member 30, and the bore 31 of each bearing member 30 is adapted for being journal supported on the outer end portion of the journal stub 29 of the plug 28 of an adjacent roller. Preferably, the bore 31 of each bearing member and the diameter of each bearing aperture 27 is made slightly larger than the outer diameter of each journal stub 29 of the plugs 28, and the outer end portion of the journal stub 29 of each plug 28 is tapered as shown at 29', so that the roller guard members may be longitudinally angled slightly with respect to each other to conform to a curve in the highway, if desired.

For facilitating assembly of the improved apparatus, the other end of the end roller member 26' may be shrunk over an annular plug 32, which is provided with an internally threaded bore 33. A journal stud 34 is screwed into the bore 33 and projects outwardly therefrom, and is journalled in the bearing aperture 27 of one end bracket member 22.

In the illustrated apparatus 10, there is one roller member 26 and one roller member 26'.

The particular construction and arrangement of the rollers 26 and 26' and the brackets 22 therefore is similar to that set forth in my said prior application, Serial No. 658,483, and is adapted for assembling and disassembling the roller members on the brackets without removing the brackets from the plank 18.

On the other hand, there is preferably sufficient clearance between the interfitting journal studs, plug bores, and the bearing apertures of the bracket members, so that if an intermediate bracket 22 has its nut and bolt securing means 24 removed from engagement of the bracket 22 with the plank 18, then the roller members supported on such a released bracket, may be disassembled.

As illustrated one roller member 26 is shown, and one end roller member 26'.

However, as shown and described in detail in my said prior application, there may be any desired number of roller members 26, the bearing member 30 of each roller member being journal supported on the journal stub 29 of the adjacent roller member 26 or 26'.

In assembling the roller members on the brackets, beginning at the rear end of the improved apparatus as viewed in Fig. 1, or at the left end thereof as viewed in Figs. 2 and 3, the journal stub end 29 at one end of the roller 26 is inserted through the bearing aperture 27 of the mounting member 25 at that end of the apparatus. Then the journal stub end 29 of the roller member 26' is inserted through the bearing aperture 27 of the intermediate mounting member 25 and into the bore 31 of the bearing member 30 at the inner end of the roller member 26, after which the journal stud 34 is inserted through the bearing aperture 27 of the mounting member 25 for the outer end of the roller member 26' and the journal stud 34 is screwed into the internally threaded annular plug 32.

The roller members are thus each rotatably mounted independently, and when a wheel of a motor vehicle strikes any one of the roller members, the normal forward rotation of the wheel will rotate the roller member downwardly in the direction of the arrow A, Fig. 1, and tend to prevent the wheel from rising above its plane of movement and from jumping or bouncing over the impinged roller member, at the same time deflecting the impinging wheel so as to direct the vehicle back into its normal path of movement, as shown in Fig. 1.

In other words, the rotation of the roller member by the impinging wheel tends to maintain the wheel upon the ground, as contrasted with a stationary guard rail which would provide frictional resistance to rotation of the wheel and tend to aid it in rising from the ground; and at the same time the impinged roller member serves to deflect the impinging wheel so as to turn the vehicle back into the traffic lane.

By locating the roller members 26 and 26' thus laterally spaced from the plank 18 mounted on the posts 13 and providing the upper fence cable 16 as heretofore described, the great proportion of vehicles striking against the apparatus are directed back into the traffic lane by operation of the roller members 26 and 26' as aforesaid.

The provision of the upper cables 16 minimizes the mental hazards of the drivers of vehicles, particularly when the apparatus 10 is used at the brink of a cliff or precipice or high bank.

If however a vehicle strikes the apparatus 10 with such great speed or in such direction, that the normal functioning of the roller members 26 and 26' is not possible, then the plank 18 and the cable 16 serve as obstructing means in the usual manner for highway guard fences.

On the other hand the provision of the preferably end anchored cable 16 connected with the upper ends of the posts 13, serves to transmit the loads imposed on the roller members 26 and 26' in the normal use of the apparatus to the earth foundation 12 through the deadmen 17, thus minimizing loosening of the posts 13 in the earth foundation 12.

Another embodiment of the present improved deflecting guard apparatus is illustrated in Figs. 6 to 8 inclusive, and is indicated generally by 110 and is installed at one side of a highway traffic lane 111.

The deflecting guard apparatus 110 includes a foundation 112 which as illustrated is constituted by the earth at the side of the highway traffic lane 111.

A plurality of longitudinally spaced posts 113 have their lower ends 114 embedded and secured in the earth foundation 112, and the posts 113 extend upwardly from the earth foundation 112.

Each post 113 is of novel construction and arrangement and each preferably includes a pair of angle members 113a and 113b. Each angle 113a includes a leg flange 113a—1 and a leg flange 113a—2; and each angle 113b includes a leg flange 113b—1 and a leg flange 113b—2.

The leg flanges 113a—1 and 113b—1 are located parallel with each other and the flanges 113a—2 and 113b—2 are located in alinement with each other and extending in opposite directions respectively from the leg flanges 113a—1 and 113b—1, and a roller mounting rigid plate member 125 is interposed between the leg flanges 113a—1 and 113b—1 and the plate member 125 and the angles 113a and 113b are secured to each other as a unit, as by nut and bolt means 124.

The posts 113 are preferably provided at their upper ends with hook bolt and nut clamping means 115 through the hooks 115' of which a fence or obstructing cable 116 longitudinally extends and is clamped against the angle flanges 113a—2 and 113b—2 of each post 113.

The opposite ends of the cable 116 beyond the end posts of the guard apparatus 110 are preferably angled downwardly and anchored in the end foundation 112 as by means of deadmen 117.

The posts 113 and the cable 116 associated with each other as above described may be said to constitute obstructing and mounting means which may be designated generally by 120 and including unitarily therein the roller mounting members 125 each extending in use laterally outwardly from its supporting angles 113a and 113b towards the highway traffic lane 111.

Rotary deflecting means designated generally by 121, and including in part the roller mounting members 125, are operatively associated with the posts 113.

In addition to the roller mounting members 125 the rotary deflecting means 120 includes longitudinally extending roller guard rail members 126 and 126', each roller member extending between adjacent pairs of the mounting members 125, and the roller members 126 and 126' are similar in details of construction and arrangement to the roller members 26 and 26' heretofore described in the apparatus 10, and the roller members 126 and 126' are journalled in bearing apertures 127 provided in the outer ends of the roller mounting members 125, in the manner heretofore described for the rotatable mounting of the roller members 26 and 26'.

In use the improved combined deflecting and obstructing guard apparatus 110 operates in a manner similar to that heretofore described for the apparatus 10.

An important advantage of the apparatus 110, arises from the fact that the same may be constructed of all steel parts, with consequent improved strength and durability, and the unitary posts 113 with the roller mounting plate members 125 thereon facilitate the erection of the apparatus.

The posts 113 may be tied to the paving 140 of the highway, as by embedding eye bolts 141 in the highway paving with the eyes extending laterally from one side thereof, and by connecting the eyes with the posts 113 as by means of hook and bolt clamping means 142, as shown in Fig. 8.

It is desirable to tie the posts 113 to the highway paving when the foundation 112 is of earth.

In Fig. 9 is illustrated a form of posts 213 which is substantially identical with one of the posts 113, with the exception that the lower end portions 214 of the post 213 is embedded in a concrete foundation 212 and may thus be of shorter length than the length of the lower portions 114 of the post 113.

I claim:

1. Guard apparatus for traffic lanes of highways and the like, including a foundation at one side of the traffic lane, a plurality of longitudinally spaced post members secured in the foundation, each post member extending upwardly above the foundation and above the upper surface of the traffic lane, a plurality of bracket members supported on the post members, the bracket members extending laterally from the post members towards the traffic lane, and a longitudinally extending rotary guard rail member journalled on the bracket members.

2. Guard apparatus for traffic lanes of highways and the like, including a foundation at one side of the traffic lane, a plurality of longitudinally spaced post members secured in the foundation, each post member extending upwardly above the foundation and above the upper surface of the traffic lane, a plurality of bracket members supported on the post members, the bracket members extending laterally from the post members towards the traffic lane, a longitudinally extending rotary guard rail member journalled on the bracket members, and a longitudinally extending fence member secured on the post members above the rotary guard rail member.

3. Guard apparatus for traffic lanes of highways and the like, including a foundation at one side of the traffic lane, a plurality of longitudinally spaced post members secured in the foundation, each post member extending upwardly above the foundation and above the upper surface of the traffic lane, a plurality of bracket members supported on the post members, the bracket members extending laterally from the post members towards the traffic lane, a longitudinally extending rotary guard rail member journalled on the bracket members, and longitudinally extending means secured to the posts and anchored to the foundation.

4. Guard apparatus for traffic lanes of highways and the like, including a foundation at one side of the traffic lane, a plurality of longitudinally spaced post members secured in the foundation, each post member extending upwardly above the foundation and above the upper surface of the traffic lane, a longitudinally extending fence member supported on the post members, a plurality of bracket members mounted on the fence member, the bracket members extending laterally from the post and fence members towards the traffic lane, and a longitudinally extending rotary guard rail member journalled on the bracket members.

5. Guard apparatus for traffic lanes of highways and the like, including a foundation at one side of the traffic lane, a plurality of longitudinally spaced post members secured in the foundation, each post member extending upwardly above the foundation and above the upper surface of the traffic lane, a first longitudinally extending fence member supported on the post members, a plurality of bracket members mounted on the first fence member, the bracket members extending laterally from the post and fence members towards the traffic lane, a longitudinally extending rotary guard rail member journalled on the bracket members, and a longitudinally extending second fence member secured on the post members above the rotary guard rail member.

6. Guard apparatus for traffic lanes of highways and the like, including a foundation at one side of the traffic lane, a plurality of longitudinally spaced post members secured in the foundation, each post member extending upwardly above the foundation and above the upper surface of the traffic lane, a longitudinally extending fence member supported on the post members, a plurality of bracket members mounted on the fence member, the bracket members extending laterally from the post and fence members towards the traffic lane, a longitudinally extending rotary guard rail member journalled on the bracket members, and longitudinally extending means secured to the posts and anchored to the foundation.

7. Guard apparatus for traffic lanes of highways and the like, including a foundation at one side of the traffic lane, and a plurality of longitudinally spaced post members secured in the foundation, each post member including a pair of angle members having opposed leg flanges and a rigid mounting member interposed between and secured to the opposed leg flanges and extending laterally from the angle members, and a longitudinally extending rotary guard rail member journalled on the rigid mounting members.

HARRY J. HICK.